United States Patent
Flur et al.

(10) Patent No.: US 8,554,522 B2
(45) Date of Patent: Oct. 8, 2013

(54) DETECTION OF DESIGN REDUNDANCY

(75) Inventors: Shaked Flur, Misgav (IL); Ziv Nevo, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/639,017

(22) Filed: Dec. 16, 2009

(65) Prior Publication Data

US 2011/0144958 A1 Jun. 16, 2011

(51) Int. Cl.
G06F 7/60 (2006.01)
G06F 9/455 (2006.01)
G06G 7/48 (2006.01)

(52) U.S. Cl.
USPC ............... 703/2; 703/6; 716/106; 716/107

(58) Field of Classification Search
None
See application file for complete search history.

(56) References Cited

U.S. PATENT DOCUMENTS

| | | | |
|---|---|---|---|
| 6,192,505 B1 | 2/2001 | Beer et al. | |
| 6,408,424 B1 * | 6/2002 | Mukherjee et al. | 716/107 |
| 6,567,959 B2 | 5/2003 | Levin et al. | |
| 7,065,726 B1 | 6/2006 | Singhal et al. | |
| 7,076,407 B2 * | 7/2006 | Liu | 703/2 |
| 7,343,575 B2 | 3/2008 | Bjesse et al. | |
| 7,428,712 B1 | 9/2008 | Singh et al. | |
| 7,464,015 B2 | 12/2008 | Iwashita | |
| 8,086,429 B2 * | 12/2011 | Baumgartner et al. | 703/2 |
| 2002/0144215 A1 | 10/2002 | Hoskote et al. | |
| 2006/0212837 A1 * | 9/2006 | Prasad | 716/5 |

OTHER PUBLICATIONS

Per Bjesse and James Kukula, "Automatic Generalized Phase Abstraction for Formal Verification", describes using 3-valued simulation for a different purpose. IEEE 2005. URL: http://scholar.lib.vt.edu/theses/available/etd-01282009-222714/unrestricted/Thesis.pdf.
Weixin Wu, "Mining constraints for Testing and Verification", Master Thesis, Virginia Polytechnic Institute and State University, 2009.

* cited by examiner

*Primary Examiner* — Omar Fernandez Rivas
*Assistant Examiner* — Nithya J Moll
(74) *Attorney, Agent, or Firm* — Ziv Glazberg (57) ABSTRACT

Augmented-domain simulation, such as ternary-based simulation may be utilized to approximate a reachability analysis of a model being model checked. The approximated reachability analysis may be utilized to detect design redundancies and modify the model to remove such redundancies. Design redundancies may include unobservable variables, mergeable variables and utilization of surplus domains.

14 Claims, 4 Drawing Sheets

DETECTION OF DESIGN REDUNDANCY

BACKGROUND

The present disclosure relates to model checking in general, and to reductions utilized prior to performing model checking in particular.

Computerized devices are an important part of the modern life. They control almost every aspect of our life—from writing documents to controlling traffic lights. However, computerized devices are bug-prone, and thus require a verification phase during which bugs should be discovered. The verification phase is considered one of the most difficult tasks in developing a computerized device. Many developers of computerized devices invest a significant portion, such as 70%, of the development cycle to discover erroneous behaviors of the computerized device, also referred to as a target computerized system. The target computerized system may comprise hardware, software, firmware, a combination thereof and the like.

During the verification phase, model checking techniques may be utilized to verify that a property is held by the target computerized system. The target computerized system is represented using a model. The model comprises a formal definition of state variables representing a state of the model. Each state variable is associated with a domain, such as for example a Boolean domain. The number of the variables and the size of their respective domains determine a number of possible states of the model, also referred to as a size of a model. The bigger the number of state, the less likely model checking may be completed before suffering from the "space-state explosion problem".

In order to reduce a size of a model, reductions may be performed prior to performing model checking. Reductions may remove design redundancies from the model without substantially changing the model. A design redundancy may enlarge a size of a model without adding "interesting" states, such as reachable states which are substantially different from other reachable states. For example, if the model comprises a reachable state that does not hold a property, a modified model, determined by a reduction, must also comprise a corresponding reachable state that does not hold the property. It will be noted that in some cases, reductions may be performed in respect to a predetermined property and may yield different results based on different properties.

An exemplary design redundancy may be a variable associated with a surplus domain, such as a domain that comprises a value that is never assigned to the variable. Another exemplary design redundancy may be a state variable whose value may be computed based on values of other variables, and therefore may be removed from the state and transformed to a non-state variable, also referred to as a combinatorial signal, representing a computation of a value based on the other variables. Yet another exemplary design redundancy may be an unobservable variable which has no affect on an output of the model. For example, a variable V may be unobservable in case in every cycle its value is used only with an OR operator with a 1 value.

BRIEF SUMMARY OF THE INVENTION

One exemplary embodiment of the disclosed subject matter is a computerized apparatus having a processor, the computerized apparatus comprising: an input module configured to receive a model comprising at least one variable, the at least one variable is associated with a domain; an augmented-domain simulator configured to simulate an execution of the model using an augmented-domain, the augmented-domain comprising the domain and an unknown value, the augmented-domain simulator comprising: a state repository for retaining states of the model determined by the augmented-domain simulator; and a fix-point determinator configured to identify convergence to a fix-point by the augmented-domain simulator based on the state repository; and design redundancy detector configured to determine a design redundancy in accordance with the states retained in the state repository.

Another exemplary embodiment of the disclosed subject matter is a method for removing a design redundancy in a model, the method is performed in a computerized environment, the method comprising: receiving the model, the model comprising at least one variable, the at least one variable is associated with a domain; performing augmented-domain simulation of an execution of the model using an augmented-domain, the augmented-domain comprising the domain and an unknown value, the performing augmented-domain simulation comprises: retaining simulated states; and identifying convergence to a fix-point; identifying the design redundancy based on the retained simulated states; and modifying the model to a modified model excluding the design redundancy, whereby the model is transformed to the modified model such that a model checker traverses the modified model in a different manner than the model checker traverses the model.

Yet another exemplary embodiment of the disclosed subject matter is a computer program product embodied on a computer readable media having computer code embodied therein for processing a method for removing a design redundancy in a model, the method comprising: receiving the model, the model comprising at least one variable, the at least one variable is associated with a domain; performing augmented-domain simulation of an execution of the model using an augmented-domain, the augmented-domain comprising the domain and an unknown value, the performing augmented-domain simulation comprises: retaining simulated states; and identifying convergence to a fix-point; identifying the design redundancy based on the retained simulated states; and modifying the model to a modified model excluding the design redundancy.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to reduce the size of a model. Another technical problem is to identify a design redundancy before initiating model checking. Yet another technical problem is to simulate a state of a model and determine all possible values of a variable without exploring the entire state-space.

One technical solution is to utilize an augmented-domain simulator to abstract model checking procedure. The augmented-domain simulator may be utilized to determine possible values of different variables. Another technical solution is to initialize a random variable with an unknown value, also referred to as "X" value or "don't care" value, and perform simulating of the model. Yet another technical solution is to determine a fix-point in respect to a portion of a state, based on a determination that any other portion of the state that may affect the portion of the state has already converged to a fix-point.

One technical effect of utilizing the disclosed subject matter is reducing a size of a model without substantially modifying the model. Another technical effect is the ability to determine all possible values that may be assigned to a variable, even though that a complete approximated fix-point analysis of the model may fail.

Figure 1:
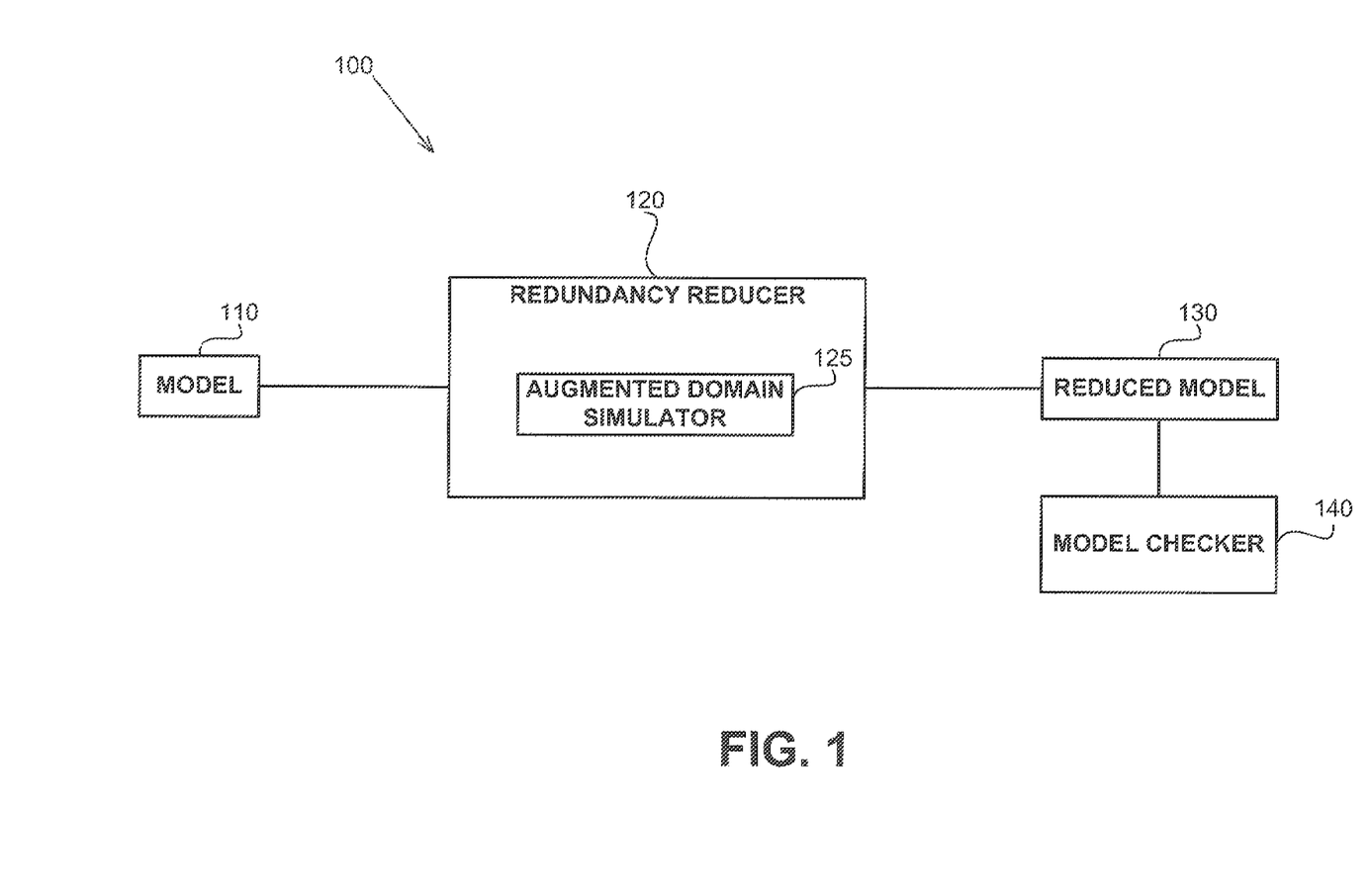
FIG. 1 shows a computerized environment in which the disclosed subject matter is used, in accordance with some exemplary embodiments of the subject matter.

Referring now to the drawings, FIG. 1 shows an exemplary computerized environment, generally designated 100, in which the disclosed subject matter may be used. The computerized environment 100 may comprise a model 110 and a redundancy reducer 120.

In some exemplary embodiments of the disclosed subject matter, the model 110 may represent a target computerized system (not shown). The model 110 may be defined by a descriptive language, such as for example SystemC, Verilog, GDL, Sugar or the like. The model 110 may comprise variables. The variables may be state variables, combinatorial signals or a combination thereof. Each variable may be associated with a domain, such as for example a Boolean domain, a domain comprising values of {3, 100, 200, 1000-9999} or the like. The model 110 may comprise constraints associated to one or more variables. The model 110 may be designed by a verification engineer, an automatic tool or other methods. It will be noted that in some exemplary embodiments, the model 110 may be a preprocessed model, such as for example a model preprocessed by other reductions, abstractions, approximations or the like.

In some exemplary embodiments of the disclosed subject matter, the redundancy reducer 120 may determine a redundancy in the model 110 and modify the model 110 to a reduced model 130. The reduced model 130 may be substantially equivalent to the model 110. The reduced model 130 may exclude a design redundancy.

In some exemplary embodiments, the redundancy reducer 120 may comprise an augmented-domain simulator 125. The augmented-domain simulator 125 may perform a simulation of the model 110. The augmented simulator 125 may perform the simulation in respect to augmented-domains that include in addition an unknown value. For example an augmented-domain of a Boolean domain is a ternary domain comprising three values: zero (0), one (1) and the unknown value (X).

In some exemplary embodiments, the computerized environment 100 comprises a model checker 140 such as a BDD-based model checker, a SAT-based model checker, an explicit model checker, an abstraction-refinement model checker or the like. The model checker 140 may perform model checking on the reduced model 130.

Figure 2:
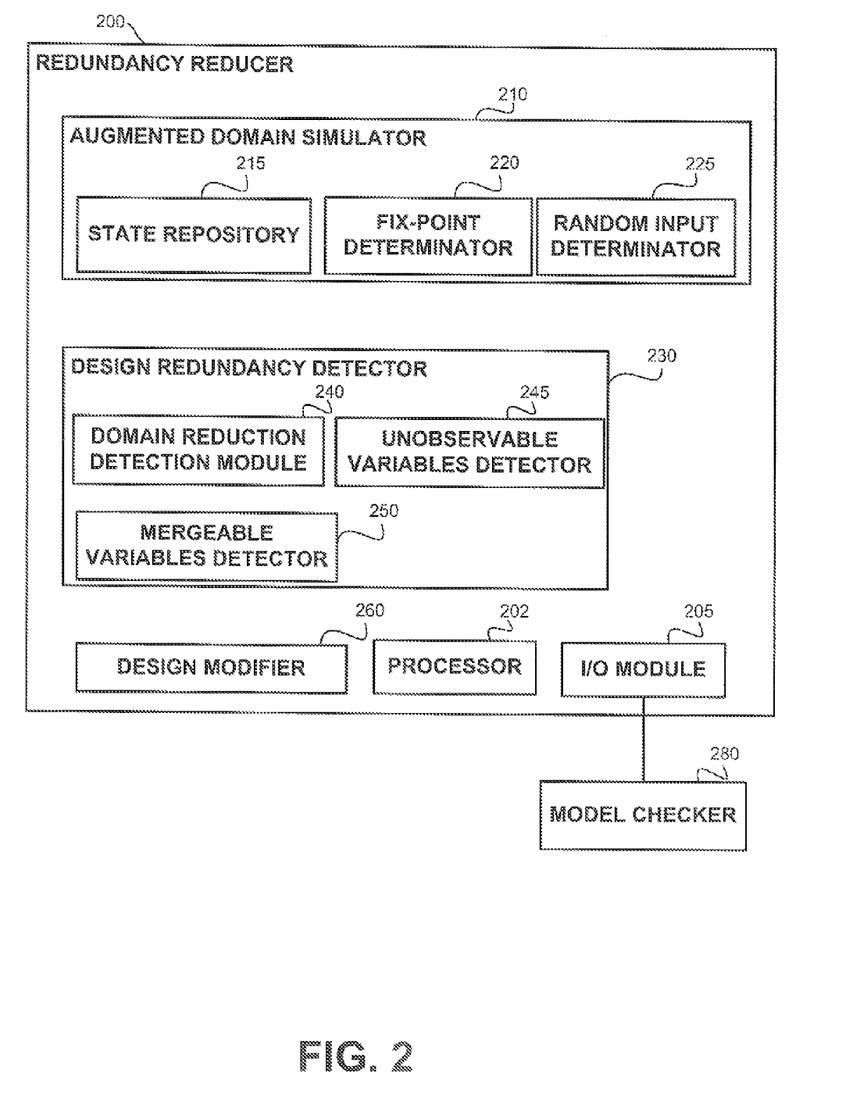
FIG. 2 shows a block diagram of a redundancy reducer in accordance with some exemplary embodiments of the disclosed subject matter.

Referring now to FIG. 2 showing a redundancy reducer in accordance with some exemplary embodiments of the disclosed subject matter. A redundancy reducer 200, such as 120 of FIG. 1, may be configured to identify a design redundancy in a model, such as 110 of FIG. 1.

In some exemplary embodiments of the disclosed subject matter, the redundancy reducer 200 may comprise an Input/Output (I/O) module 205. The I/O module 205 may be utilized to receive, retrieve or otherwise obtain a model from a user, a computerized system or the like. The I/O module 205 may be utilized to output an indication to a user (not shown) identifying a design redundancy. The I/O module 205 may be utilized to provide a modified module, such as 130 of FIG. 1, to a model checker 280, such as 140 of FIG. 1. The I/O module may comprise a modem, a keyboard, a pointing device, a file system interface, an Application Programming Interface (API), a socket, a terminal or the like.

In some exemplary embodiments, the redundancy reducer 200 may comprise a processor 202. The processor 202 may be a Central Processing Unit (CPU), a microprocessor, an electronic circuit, an Integrated Circuit (IC) or the like. The processor 202 may be utilized to perform computations required by the redundancy reducer 200 or any of it subcomponents.

In some exemplary embodiments, the redundancy reducer 200 may comprise an augmented-domain simulator 210, such as 125 of FIG. 1. The augmented-domain simulator 210 may simulate an execution of the model. The augmented-domain simulator 210 may simulate values of variables of the model in different cycles. The simulated values of a variable may be selected from an augmented-domain comprising an original domain corresponding to the variable and an unknown value. For example, in case the original domain is a Boolean domain, the augmented-domain may be a ternary domain, and the augmented-domain simulator 210 may utilize ternary logic in computation of values.

In some exemplary embodiments, the augmented-domain simulator 215 may comprise a state repository 215. The state repository 215 may retain a set of states encountered by the augmented-domain simulator 210 during simulation. The state repository 215 may be a database, a region in a memory space, a data structure such as a hash table or the like.

In some exemplary embodiments, the augmented-domain simulator 210 may comprise a fix-point determinator 220. In some exemplary embodiments, the fix-point determinator 220 may be an early fix-point determinator, such as disclosed below in respect to FIG. 3. The fix-point determinator 220 may determine whether a fix-point of a simulated state has been reached by the augmented-domain simulator 210. The fix-point may be determined based on states retained in the state repository 215, values in a Bloom filter or the like. There may be a convergence to a fix-point in case a next state computed by the augmented-domain simulator 210 has been previously processed by the augmented-domain simulator 210.

In some exemplary embodiments, the augmented-domain simulator 210 may comprise a random input determinator 225. The random input determinator 225 may determine a value of a random input of the model. The random input may be defined by the model to be selected from a domain. The random input may be assigned an unknown value representing an unknown value selected from the domain. The model may utilize the random input to set an initial value of a state variable, to set a value of a combinatorial signal or the like.

In some exemplary embodiments, the redundancy reducer 200 may comprise a design redundancy detector 230. The design redundancy detector 230 may be configured to identify or otherwise determine a design redundancy based on the simulation performed by the augmented-domain simulator 210. The design redundancy detector 230 may be configured to utilize the states retained in the state repository 215 to determine the design redundancy. In some exemplary embodiments, the states in the state repository 215 may be an approximation of all reachable states of the model. As some values of the retained state may be defined as unknown, a retained state may represent several of states in the model. The states may be ordered in accordance with a cycle of the model. The states may represent an approximation of all reachable states in a first cycle, all reachable states in a second cycle and so on. The reachable states in each cycle may be utilized to determine a design redundancy by the design redundancy detector 230.

In some exemplary embodiments, the design redundancy detector 230 may comprise a domain reduction detection module 240. The domain reduction detection module 240 may determine all possible values assigned to a variable of the model, such as a state variable, a combinatorial signal or the like, in the states retained in the state repository 215. The states retained in the state repository 215 may represent all reachable states of the model. The states retained in the state repository 215 may comprise all values assigned to the variable in all reachable states of the model. The domain reduction detection module 240 may reduce a domain of a variable that is never assigned the unknown value in all reachable states. The determination of the domain reduction detection module 240 may be utilized to reduce a domain to consist only of the values assigned to the variable in all reachable states. The domain reduction detection module 240 may determine a domain consisting of a single value, such as {zero} ({0}), {one} ({1}) or the like. A determination of a domain consisting of a single value by the domain reduction detection module 240 may be utilized to determine that the value of the variable is constant, and to propagate the constant value. In case a value of a variable is constant, the variable may be removed from the state. By removing a variable having a constant value, a size of the model is reduced without substantially modifying the model. A design redundancy determined by the domain reduction detection module 240 may be an overly broad domain, a constant variable or the like.

In some exemplary embodiments, the design redundancy detector 230 may comprise an unobservable variables detector 245. The unobservable variables detector 245 may detect an unobservable variable. In some exemplary embodiments, an unobservable variable may be removed from the model, without substantially modifying the model. In such a case the size of the model is reduced. A design redundancy determined by the unobservable variables detector 245 may be a redundant variable whose value is unobservable, such as for example to an output of the model In some exemplary embodiments, the design redundancy detector 230 may comprise a mergeable variables detector 250. The mergeable variables detector 250 may detect or otherwise determine a set of two or more variables whose values are connected to one another in every cycle using a predetermined mapping. The predetermined mapping may be a value to the same value mapping, such as in case two or more variables have a same value in every cycle. The predetermined mapping may be a combinatorial relation between the values of two variables. A variable having a value that may be represented by a predetermined mapping from a value of another variable may be removed from the model and replaced by a combinatorial implementation of the predetermined mapping. A design redundancy determined by the mergeable variables detector 250 may be a redundancy variable whose value may be replaced by the combinatorial implementation.

In some exemplary embodiments, the mergeable variables detector 250 may partition the variables of the model into equivalence classes based on an initial value of a variable. The equivalence classes may be split to equivalence classes of variables having in addition a same value in a first cycle. The equivalence classes may be further split until all the states retained in the state repository 215 are processed. For each equivalence class, all variables in the equivalence class are deemed to have a same value in every cycle and therefore all but one variable may be omitted from the model. The values of the omitted variables may be replaced by a value of the non-omitted variable. In a similar manner, a predetermined mapping between equivalence classes may be inspected in order to determine that all variables in an equivalence class may be omitted an replaced by a combinatorial implementation of the predetermined mapping in respect to a value of a variable in a different equivalence class.

It will be noted that in some exemplary embodiments the operations of the domain reduction detection module 240, the unobservable variables detector 245 or the mergeable variables detector 250 may enable a modification of the model such that the modified model has a smaller size, less number of variables or otherwise may be more efficiently model checked. In some exemplary embodiments, the modified model may be preprocessed by abstractions, reductions or other preprocessing techniques before being model checked by the model checker 280. The preprocessing techniques may be more beneficial due to the modifications made to the model based on the design redundancy detected by the design redundancy detector 230.

In some exemplary embodiments, the redundancy reducer 200 may comprise a design modifier 260 configured to modify the model to exclude the design redundancy determined by the design redundancy detector 230. The modified model may be 130 of FIG. 1.

In some exemplary embodiments, the redundancy reducer 200 may further comprise the model checker 280.

Figure 3:
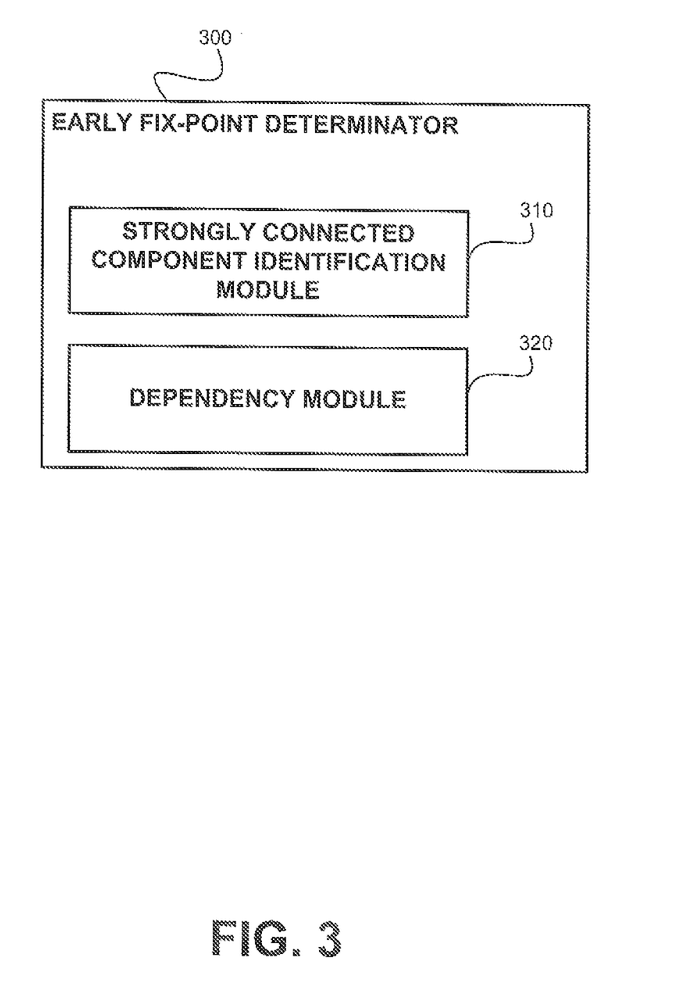
FIG. 3 shows a block diagram of an early fix-point determinator in accordance with some exemplary embodiments of the disclosed subject matter.

Referring now to FIG. 3 showing a block diagram of an early fix-point determinator in accordance with some exemplary embodiments of the disclosed subject matter.

An early fix-point determinator 300 may be configured to identify convergence to a fix-point in respect to a portion of a state of the model. The state of the model may be defined by a list of values corresponding to a list of state variables in the model. The portion of the state may be a list of values corresponding to a portion of the list of the state variables. For example, in case there are six state variables: A, B, C, D, E, F, a fix-point in respect to a portion of the state representing two variables out of the six, such as for example A and B, may be determined by the early fix-point determinator 300.

In some exemplary embodiments, the early fix-point determinator 300 may comprise a Strongly Connected Component (SCC) identification module 310. The SCC identification module 310 may be configured to partition the state variables into a plurality of SCCs. Referring again to the aforementioned example a first SCC may be {A,D}, a second SCC may be {B} and a third SCC may be {C,E,F}.

In some exemplary embodiments, the early fix-point determinator 300 may comprise a dependency module 320 configured to determine a portion of the plurality of SCCs, such as for example the second SCC, that influences another SCC, such as for example the first SCC. The dependency module 320 may determine a condensation graph representing the model by contracting each SCC to a single vertex. The early fix-point determinator 300 may identify a convergence to a fix-point in respect to an SCC based on the dependency determined by the dependency module 320. The fix-point in respect to the SCC may be determined in case a fix-point is reached in respect to an associated portion of the state. The associated portion of the state may comprise variables in SCCs on which the SCC depends. The SCCs on which the SCC depends may be determined by the dependency module 320.

Referring again to the aforementioned example, a fix-point in respect to variables {A,D} may be determined in case a portion of a currently simulated state determined by the augmented-domain simulator has previously been encountered. The portion of the currently simulated state is comprised of the values of the variables in the first SCC and the second SCC: {A,B,D}.

It will be noted that an early fix-point determinator 300 may enable identification of fix-point in respect to a portion of the model and performing a design redundancy detection in respect to the portion prior to finalizing the approximated reachability analysis of the entire model. In some exemplary embodiments, full approximated reachability analysis may not be completed due to resource limitations, such as time, memory or the like. In some exemplary embodiments, early fix-point detection may enable modification of the model such that full approximated reachability analysis may be completed when using the same resources as before. In some exemplary embodiments, analysis of end components of the model may be enabled due to early fix-point determination, since a fix-point of the end component, and all components that may influence the end component, is relatively easier to determine in respect to a full fix-point of the entire model.

In some exemplary embodiments, an unobservable variable may be a variable whose output is unobservable in respect to an output of an SCC comprising the variable.

Figure 4:
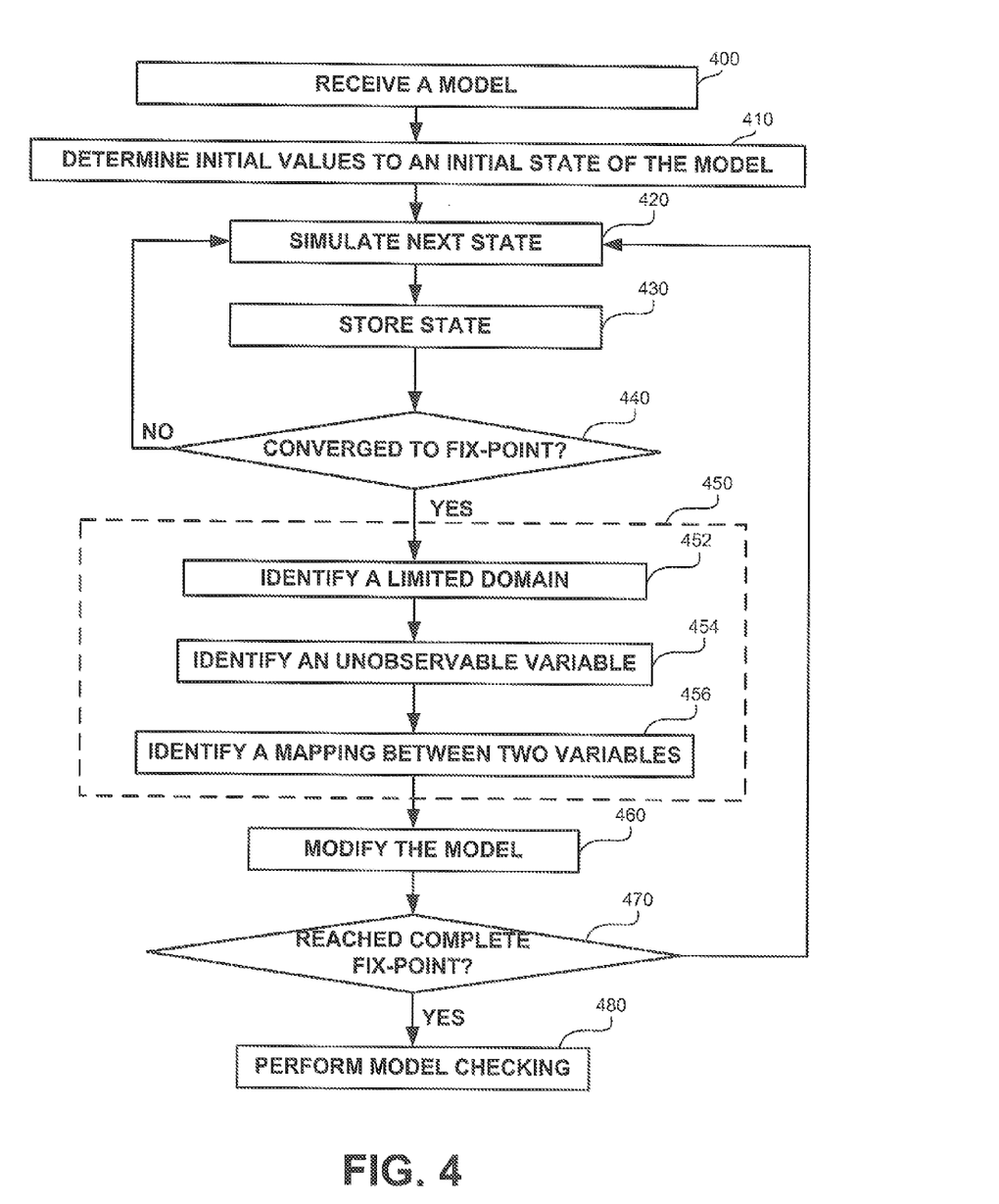
FIG. 4 shows a flowchart diagram of a method in accordance with some exemplary embodiments of the disclosed subject matter.

Referring now to FIG. 4 showing a flowchart diagram of a method in accordance with some exemplary embodiments of the disclosed subject matter.

In step 400, a model, such as 110 of FIG. 1, may be received. The model may be received by a receiver, such as I/O module 205 of FIG. 2.

In step 410, initial values of the initial state of the model may be determined. The initial values may be determined by an augmented-domain simulator, such as 210 of FIG. 2. The initial values may be unknown values, in case the initial values depend on random inputs, in case the initial values are unknown or undetermined, or in similar cases. The unknown values may be set by a random input determinator, such as 225 of FIG. 2.

In step 420, a next state is simulated. The next state may be simulated by an augmented-domain simulator, such as 210 of FIG. 2. The next state may be computed based on combinatorial logic in respect to the augmented domain that further comprises the unknown value. In case the next state is computed based on random inputs, a random input determinator, such as 225 of FIG. 2, may determine an unknown value to the random input.

In step 430, the simulated state may be stored in a state repository, such as 215 of FIG. 2.

In step 440 a determination may be made whether a convergence to fix-point is detected. The determination may be performed by a fix-point determinator, such as 220 of FIG. 2, or an early fix-point determinator, such as 300 of FIG. 3. The determination may be made in respect to a portion of the state. The determination may be made based on states stored in the state repository, based on a Bloom filter, or based on other methods identifying whether a state (or a portion thereof) was previously encountered. In case a fix-point is not reached, step 420 is performed again to continue simulation. In case a fix-point was reached, step 450 may be performed.

In step 450, a design redundancy may be searched for and preferably identified. In some exemplary embodiments, step 450 may comprise steps 452, 454, 456, a combination thereof or the like. Step 450 may be performed by a design redundancy detector, such as 230 of FIG. 2. In case of an early fix-point analysis, step 450 may relate to variables corresponding to SCCs for which a fix-point was reached.

In step 452, a limited domain may be identified. The limited domain may be identified by a domain reduction detection module, such as 240 of FIG. 2. The limited domain may be associated with a variable. The limited domain may comprise values that the variable may be assigned. The limited domain may comprise less values than a corresponding domain defined by the model. In some exemplary embodiments, the limited domain comprises a single value and the variable is deemed a constant, whose value may be propagated.

In step 454, an unobservable variable may be identified. The unobservable variable may be identified by an unobservable variables detector, such as 245 of FIG. 2.

In step 456, a mapping between two variables may be identified. The mapping may be identified by a mergeable variables detector, such as 250 of FIG. 2.

In step 460, the model may be modified in respect to one or more design redundancies determined in step 450. The model may be modified by a design modifier, such as 260 of FIG. 2.

In step 470, a determination may be made whether or not a full approximated reachability analysis of the model was completed. In case a full approximated reachability analysis was completed, step 480 may be performed. Otherwise, a reachability analysis may continue by performing step 420 to continue model simulation. In some exemplary embodiments, step 470 may be omitted in case the fix-point determined in step 440 may not be an early fix-point. In some exemplary embodiments, step 470 may determine whether the resources allocated for the exemplary method are exhausted or not. In case the resources are exhausted, the flow may continue to step 480 even though the reachability analysis may not have been completed.

In step 480, model checking may be performed on the model. Model checking may be performed by a model checker such as for example 140 of FIG. 1. The model checker may be a any available model checker, such as an off-the-shelf model checker.

It will be appreciated that a fix-point analysis in view of the disclosed subject matter may be an approximated fix-point analysis. In some exemplary embodiments, an approximated fix-point analysis may succeed using resources that would not enable a precise fix-point analysis to succeed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the computerized apparatus comprising:
an input module configured to receive a model comprising at least one variable, the at least one variable is associated with a domain;
an augmented-domain simulator configured to utilize the processor to simulate an execution of the model using an augmented-domain, the augmented-domain comprising the domain and an unknown value, said augmented-domain simulator comprising:
a state repository for retaining states of the model determined by said augmented-domain simulator; and a fix-point determinator configured to identify convergence to a fix-point by said augmented-domain simulator based on said state repository; and
design redundancy detector configured to determine a design redundancy in accordance with the states retained in said state repository, wherein the design redundancy detector comprises an unobservable variables detector, wherein said design redundancy detector comprises a mergeable variables detector configured to identify a first variable having a first value that is represented by a mapping from a second value of a second variable.

2. The computerized apparatus of claim 1, wherein said design redundancy detector comprises a domain reduction detection module.

3. The computerized apparatus of claim 1, wherein said fix-point determinator is an early fix-point determination module configured to identify convergence to a fix-point in respect to a portion of a state.

4. The computerized apparatus of claim 1, wherein the at least one variable is selected from the group consisting of a state variable and a combinatorial signal.

5. The computerized apparatus of claim 1 further comprising a design modifier configured to determine a modified model excluding the design redundancy; and a model checker configured to execute the modified model.

6. The computerized apparatus of claim 1, wherein said augmented-domain simulator comprises a random input determinator configured to set an initial value of a random input to the unknown value.

7. A computerized apparatus having a processor, the processor comprising:
an input module configured to receive a model comprising at least one variable, the at least one variable is associated with a domain;
an augmented-domain simulator configured to simulate an execution of the model using an augmented-domain, the augmented-domain comprising the domain and an unknown value, said augmented-domain simulator comprising:
a state repository for retaining states of the model determined by said augmented-domain simulator; and
a fix-point determinator configured to identify convergence to a fix-point by said augmented-domain simulator based on said state repository; and
design redundancy detector configured to determine a design redundancy in accordance with the states retained in said state repository, wherein said design redundancy detector comprises a mergeable variables detector configured to identify a first variable having a first value that is represented by a mapping from a second value of a second variable.

8. A computerized apparatus having a processor, the processor comprising:
an input module configured to receive a model comprising at least one variable, the at least one variable is associated with a domain;
an augmented-domain simulator configured to utilize the processor to simulate an execution of the model using an augmented-domain, the augmented-domain comprising the domain and an unknown value, said augmented-domain simulator comprising:
a state repository for retaining states of the model determined by said augmented-domain simulator; and
a fix-point determinator configured to identify convergence to a fix-point by said augmented-domain simulator based on said state repository; and
design redundancy detector configured to determine a design redundancy in accordance with the states retained in said state repository,
wherein the fix-point determinator is an early fix-point determination module configured to identify convergence to a fix-point in respect to a portion of a state, wherein said early fix-point determination module comprises:
a strongly connected component identification module configured to partition state variables into a plurality of strongly connected components;
a dependency module configured to determine a portion of the plurality of strongly connected components determined by said strongly connected component identification module, the portion of the plurality of strongly connected components is characterized in influencing a value of a strongly connected component selected from the plurality of strongly connected components;
wherein said early fix-point determination module is configured to identify a fix-point in respect to a first portion of the state associated with the strongly connected component based upon a fix-point of a second portion of the state associated with the portion of the plurality of strongly connected components.

9. A method for removing a design redundancy in a model, said method is performed in a computerized environment, said method comprising:
receiving the model, the model comprising at least one variable, the at least one variable is associated with a domain;
using a computer to perform augmented-domain simulation of an execution of the model using an augmented-domain, the augmented-domain comprising the domain and an unknown value, said performing augmented-domain simulation comprises:
retaining simulated states; and
identifying convergence to a fix-point;
identifying the design redundancy based on the retained simulated states; and
modifying the model to a modified model excluding the design redundancy, whereby the model is transformed to the modified model such that a model checker traverses the modified model in a different manner than the model checker traverses the model, wherein the identifying a design redundancy comprises identifing an unobservable variable;
whereby the modified model comprises a reduced number of variables than the model; and
wherein at least one of said receiving, performing, identifying and modifying is performed by a computer;
wherein said identifying a design redundancy comprises determining a limited domain associated with the at least one variable, the limited domain is a subset of the domain; whereby the modified model comprises a reduced number of states than the model.

10. The method of claim 9, wherein said identifying a design redundancy comprises replacing a first state variable with a combinatorial signal, a value of the combinatorial signal is dependent on a value of a second state variable whereby the modified model comprises a reduced number of state variables than the model.

11. The method of claim 9, wherein said identifying convergence to a fix-point comprises an identifying a convergence to a fix-point in respect to a portion of a state.

12. The method of claim 11, wherein said identifying a convergence to a fix-point in respect to a portion of a state comprises:
- partitioning state variables into a plurality of strongly connected components;
- determining a portion of the plurality of strongly connected components influencing a value of a strongly connected component selected from the plurality of strongly connected components; and
- identifying a convergence to the fix-point in respect to a first portion of the state associated with the strongly connected component based upon a fix-point of a second portion of the state associated with the portion of the plurality of strongly connected components.

13. The method of claim 9 further comprises performing a model checking on the modified model.

14. The method of claim 9, wherein said performing augmented-domain simulation comprises setting an initial value of a random input to the unknown value.

* * * * *